(12) United States Patent
Liao

(10) Patent No.: US 10,079,972 B2
(45) Date of Patent: Sep. 18, 2018

(54) METHOD FOR CONTROLLING GRAPHICAL USER INTERFACE OF CAMERA APPLICATION

(71) Applicant: MEDIATEK INC., Hsin-Chu (TW)

(72) Inventor: Cheng-Yu Liao, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/398,828

(22) Filed: Jan. 5, 2017

(65) Prior Publication Data

US 2017/0264818 A1    Sep. 14, 2017

Related U.S. Application Data

(60) Provisional application No. 62/358,193, filed on Jul. 5, 2016, provisional application No. 62/306,109, filed on Mar. 10, 2016.

(51) Int. Cl.
*H04N 5/232* (2006.01)
*G06F 3/0481* (2013.01)
*G06F 3/0484* (2013.01)
*G06F 3/0488* (2013.01)
*G06T 3/40* (2006.01)
*G06T 3/60* (2006.01)

(52) U.S. Cl.
CPC ..... *H04N 5/23216* (2013.01); *G06F 3/04817* (2013.01); *G06F 3/04845* (2013.01); *G06F 3/04883* (2013.01); *G06T 3/40* (2013.01); *G06T 3/60* (2013.01); *H04N 5/23293* (2013.01)

(58) Field of Classification Search
None
See application file for complete search history.

(56) References Cited

U.S. PATENT DOCUMENTS

2013/0307801 A1    11/2013  Nam
2015/0373085 A1    12/2015  Wang et al.

FOREIGN PATENT DOCUMENTS

| CN | 104536664 A | 4/2015 |
| TW | 201426498 A | 7/2014 |
| TW | 201528113 A | 7/2015 |

*Primary Examiner* — Roberto Velez
*Assistant Examiner* — Yih-Sien Kao
(74) *Attorney, Agent, or Firm* — McClure, Qualey & Rodack, LLP

(57) ABSTRACT

A method for controlling a graphical user interface (GUI) of a camera application on a portable electronic device is provided. The portable electronic device includes a camera, a touch screen, and a sensor. The method includes the steps of: executing the camera application on the portable electronic device, wherein the GUI includes one or more shutter buttons that control the camera to take a photo; detecting whether the portable electronic device is in a portrait mode or a landscape mode according to sensor data from the sensor; determining positions of the shutter buttons of the GUI in response to the detection result; and rendering the shutter buttons at the determined positions on the GUI displayed on the touch screen.

16 Claims, 18 Drawing Sheets

METHOD FOR CONTROLLING GRAPHICAL USER INTERFACE OF CAMERA APPLICATION

CROSS REFERENCE TO RELATED APPLICATIONS

This application claims the benefit of U.S. Provisional Application No. 62/306,109, filed on Mar. 10, 2016, and U.S. Provisional Application No. 62/358,193, filed on Jul. 5, 2016, the entireties of which are incorporated by reference herein.

BACKGROUND OF THE INVENTION

Field of the Invention

The invention relates to an electronic device, and, in particular, to a method and a portable electronic device for controlling a graphical user interface of a camera application to increase user convenience when taking a photo.

Description of the Related Art

With advances in technology, it has become very popular to take photos using mobile devices such as smartphones, camera phones, or tablets. However, while a user may take a photo by holding a mobile device with one hand, it may be inconvenient for the user to press the shutter button because the finger that is free to press the shutter button may be too far to reach the shutter button. Additionally, it may also be difficult to press the shutter button in order to hold the smartphone steady with the fingers of one hand.

A conventional method to solve the aforementioned problem is to take a photo using a hardware volume button that can be deployed on one of the side surfaces or the back side of the portable device. It becomes slightly convenient for the user to take a photo using the fixed hardware volume button. However, when the orientation of the mobile device is changed, such as how the orientation changes between a landscape mode and a portrait mode, the fingers that the user holds the mobile device with may vary, and the user is possibly unable to reach the fixed hardware volume button, resulting in poor user experience.

Another conventional method to solve the aforementioned problem is running a special camera application to set the whole touch screen of the mobile device as the shutter button to take a photo. However, since the whole touch screen of the mobile device has been set as the shutter button, it becomes inconvenient to set other advanced options such as auto focusing and auto exposure settings on the touch screen, and the user can only take a photo by pressing on the touch screen with fixed auto focusing and auto exposure settings.

In view of the above, there is demand for a method and a portable electronic device for controlling a graphical user interface of a camera application to increase user convenience for taking a photo.

BRIEF SUMMARY OF THE INVENTION

A detailed description is given in the following embodiments with reference to the accompanying drawings.

In an exemplary embodiment, a method for controlling a graphical user interface (GUI) of a camera application on a portable electronic device is provided. The portable electronic device comprises a camera, a touch screen, and a sensor. The method includes the steps of: executing the camera application on the portable electronic device, wherein the GUI includes one or more shutter buttons that control the camera to take a photo; detecting whether the portable electronic device is in a portrait mode or a landscape mode according to sensor data from the sensor; determining positions of the shutter buttons of the GUI in response to the detection result; and rendering the shutter buttons at the determined positions on the GUI displayed on the touch screen.

In another exemplary embodiment, a method for controlling a graphical user interface (GUI) of a camera application on a portable electronic device is provided. The portable electronic device comprises a camera, a touch screen, and a plurality of sensors. The method includes the steps of: executing the camera application on the portable electronic device, wherein the GUI comprises a default shutter button and a first shutter button that control the camera to take a photo; determining whether to enter a configuration mode of the portable electronic device according to a specific gesture from a user on the touch screen; determining a first position and first size of the first shutter button of the GUI according to a user's input on the touch screen when it is determined to enter the configuration mode; updating the first position and first size of the first shutter button to the user's preference settings; and rendering the first shutter button at the first position and first size on the GUI displayed on the touch screen according to the updated user's preference settings.

In another exemplary embodiment, a portable electronic device is provided. The portable electronic device includes: a camera, a touch screen, a sensor, and a processor. The processor is for executing the camera application on the portable electronic device, wherein the GUI comprises one or more shutter buttons that control the camera to take a photo. The processor detects whether the portable electronic device is in a portrait mode or a landscape mode according to sensor data from the sensor. The processor further determines positions of the shutter buttons of the GUI in response to the detection result, and renders the shutter buttons at the determined positions on the GUI displayed on the touch screen.

In yet another exemplary embodiment, a portable electronic device is provided. The portable electronic device includes: a camera, a touch screen, a plurality of sensors, and a processor. The processor is for executing the camera application on the portable electronic device, wherein the GUI comprises a default shutter button and a first shutter button that control the camera to take a photo. The processor further determines whether to enter a configuration mode of the portable electronic device according to a specific gesture from a user on the touch screen, and determines a first position and first size of the first shutter button of the GUI according to a user's input on the touch screen when it is determined to enter the configuration mode. The processor further updates the first position and first size of the first shutter button to the user's preference settings, and renders the first shutter button at the first position and first size on the GUI displayed on the touch screen according to the updated user's preference settings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
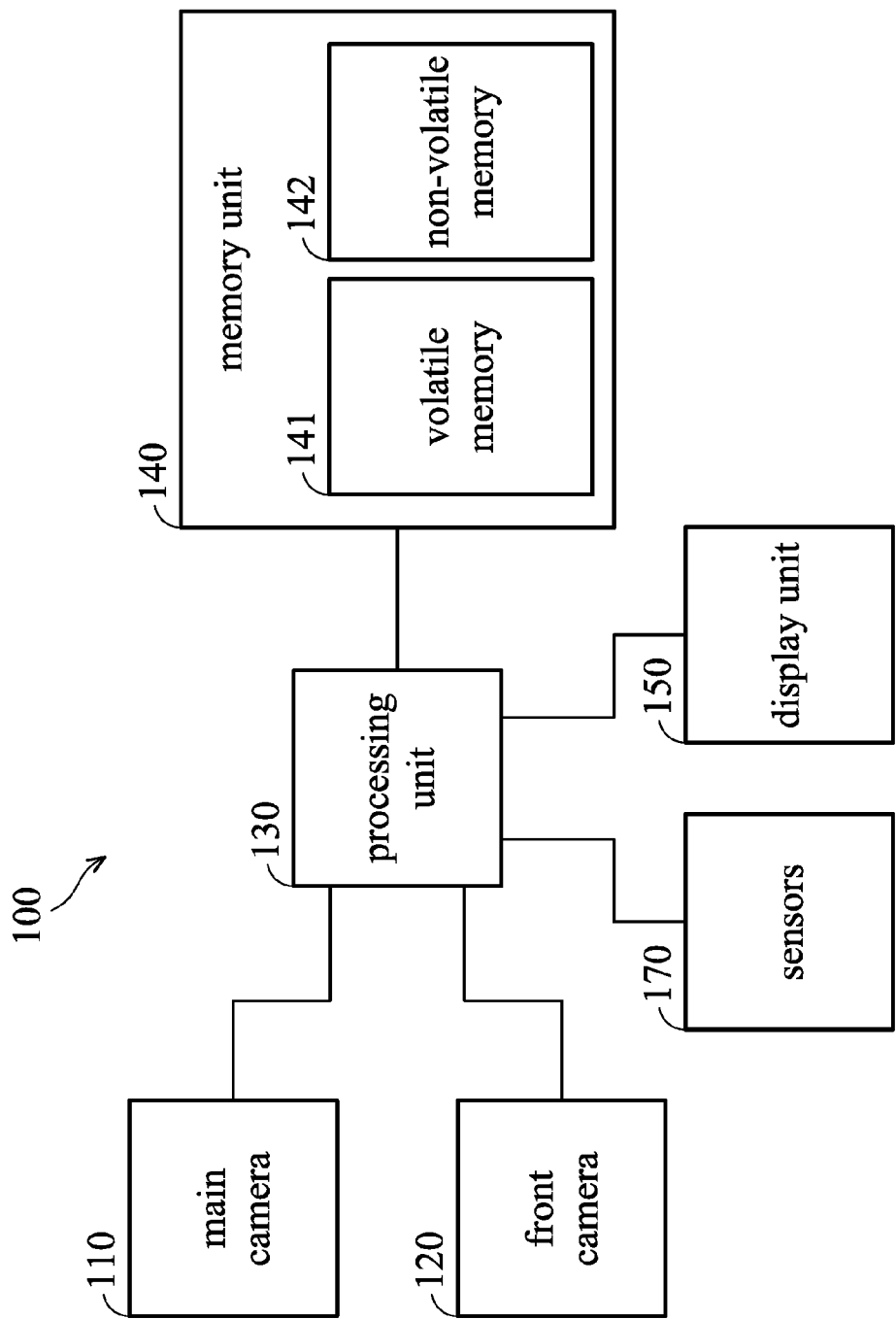
FIG. 1 is a block diagram of a portable electronic device 100 in accordance with an embodiment of the invention.

FIG. 1 is a block diagram of a portable electronic device 100 in accordance with an embodiment of the invention. The portable electronic device 100 may be a smartphone, a tablet, or a camera phone, etc. For example, the electronic device 100 comprises a main camera 110, a front camera 120, a processing unit 130, a memory unit 140, and a display unit 150. The components of the electronic device 100 are disposed within a housing (not shown in FIG. 1), and the main camera 110 and the front camera 120 are disposed at opposite surfaces of the housing. In some embodiments, the front camera 120 can be omitted.

For example, the processing unit 130 may include one or more processors or microprocessors. The memory unit 140 includes a volatile memory 141 and a non-volatile memory 142. The non-volatile memory 142 is capable of holding instructions and data without power and may store the software routines for controlling the electronic device 100 in the form of computer-readable program instructions. The volatile memory 141 may be applied as a main memory for the processing unit 130 for executing software routines and other selective storage functions. The non-volatile memory (e.g. flash memory, ROM, etc.) 142 may also contain a user interface application (e.g. camera application), which provides functionality for the portable electronic device 100 and can output a graphical user interface on the display unit 150, which may be a touch-sensitive display (i.e. a "touch screen").

In some embodiments, the portable electronic device 100 further comprises one or more sensors 170 that are used to detect temperature, pressure, or acoustic waves as an input from the user. The sensors 170 may also include an accelerometer, a gyroscope, and a magnetometer that are capable of detecting the speed and orientation of the portable electronic device 100.

Figure 2A:
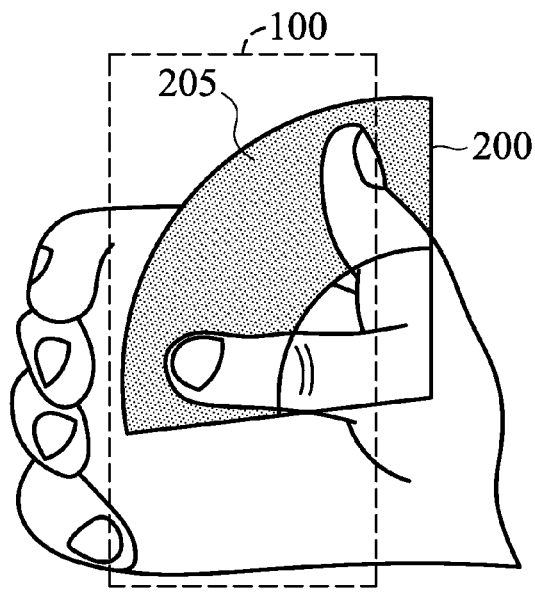
FIG. 2A is a diagram illustrating a comfort zone.

FIG. 2A is a diagram illustrating a comfort zone.

Referring to FIG. 2A, when a user holds the portable electronic device 100 in a portrait mode to take a photo with one hand, the user may shape the hand as illustrated in FIG. 2A. The user holds the portable electronic device 100 with the other four fingers of the right hand except for the thumb. Thus, the user inputs information such as a specific request by touching the shutter button of the graphical user interface displayed on the touch screen with the thumb. A fan-shaped area 200 defines a range in which the thumb may reach on the touch screen.

In an embodiment, a comfort zone 205 may be defined as an area which can be touched by the thumb of the user or an area above which the thumb can be placed, i.e. the whole fan-shaped area 200. In another embodiment, the comfort zone 205 may be defined as a part of the fan-shaped area 200, which is readily touchable by the thumb or easily sensible, e.g. a shaded part of the fan-shaped area 200.

Figure 2B:
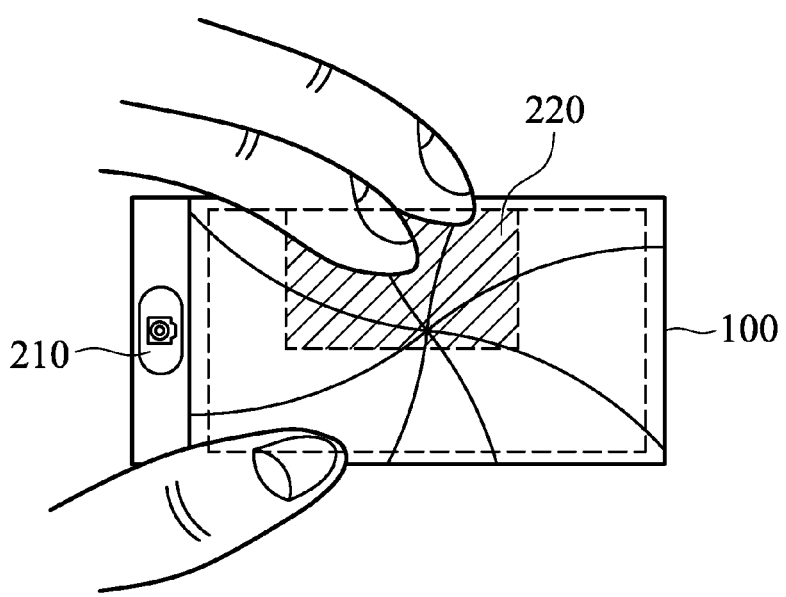
FIG. 2B is a diagram illustrating another comfort zone.

FIG. 2B is a diagram illustrating another comfort zone.

Referring to FIG. 2B, when a user holds the portable electronic device 100 in a landscape mode to take a photo with one hand, the user may also shape the hand as illustrated in FIG. 2B. The user holds the portable electronic device 100 with the other four fingers (especially the thumb and middle finger) of the left hand except for the index finger.

When the shutter button 210 is disposed at the bottom of the display unit 150 by default, the user has to bend or stretch the index finger to reach the shutter button 210, and this may result in unstable holding of the portable electronic device 100. That is, the default position of the shutter button is not within the comfort zone 220 (i.e. the shaded area) of the index finger while the user holds the portable electronic device as shown in FIG. 2B. It should be noted that the comfort zone 220 for the index finger in the landscape mode shown in FIG. 2B is not similar to the comfort zone 205 for the thumb shown in FIG. 2A since the holding fingers for the portable electronic device 100 are different in the landscape mode and in the portrait mode. For example, the comfort zone 220 for the index finger in the landscape mode may be restricted in a specific area within a touchable region by the index finger, which is readily touchable by the index finger or easily sensible.

Figure 3A:
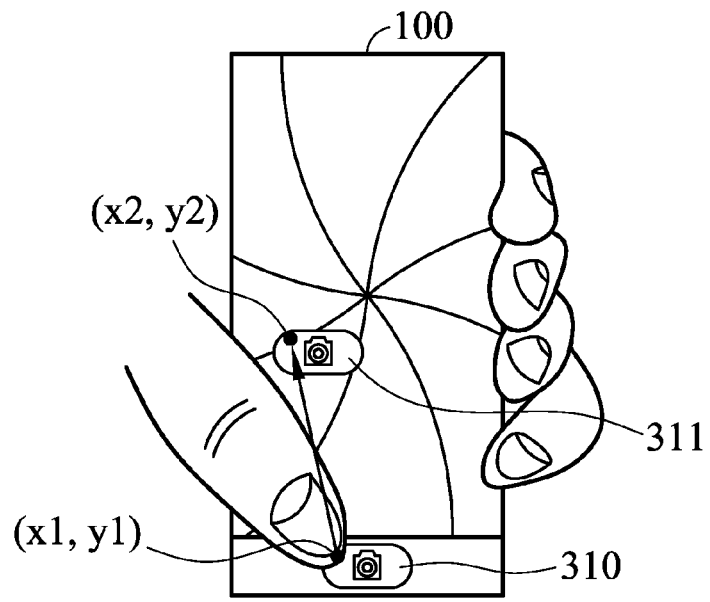
FIG. 3A-3C are diagrams of manipulating a shutter button on the graphical user interface of a camera application in accordance with an embodiment of the invention.
Figure 3B:
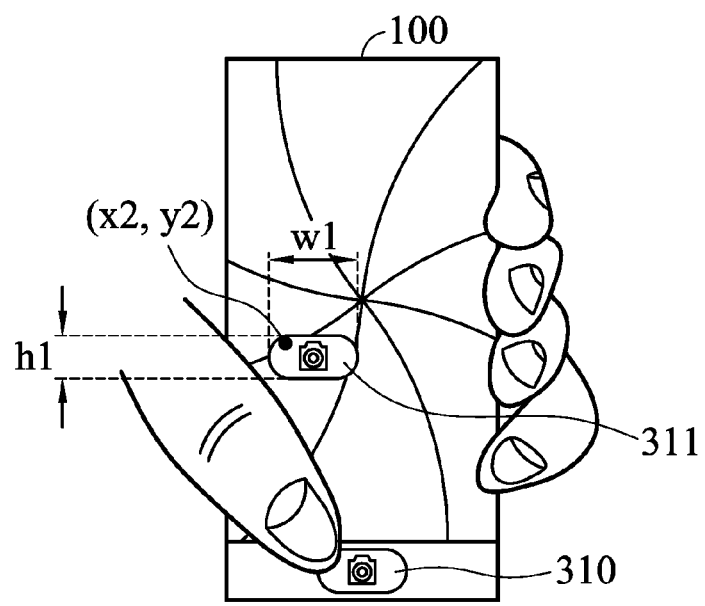
Figure 3C:
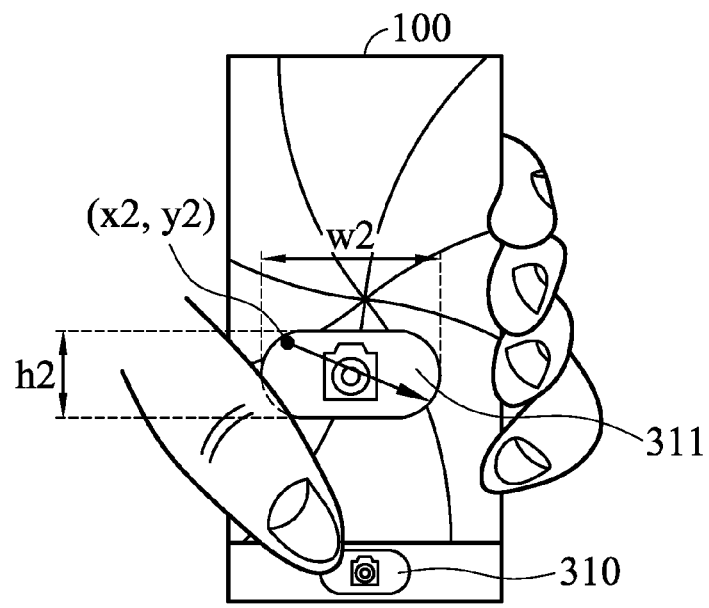

FIG. 3A-3C are diagrams of manipulating a shutter button on the graphical user interface of a camera application in accordance with an embodiment of the invention. Referring to FIG. 3A, given that the reference point of the shutter button is located at the upper-left corner, the default position of reference point of the shutter button 310 is located at (x1, y1). In an embodiment, the user holds the portable electronic device 100 with his left hand as shown in FIG. 3A, and it is inconvenient for the user to press the shutter button 310 while taking a photo. Thus, the user may want to move the shutter button 310 to the comfort zone of the thumb of his left hand. The user may manually activate the configuration mode of the camera application to move the position of the shutter button 310.

Referring to FIG. 3A, the user may activate the configuration mode of the camera application using a force touch action before executing the camera application to take a photo. For example, the user may touch his finger on the shutter button 310 at the default position (x1, y1), and add sufficient pressure (i.e. the touch screen may detect pressure on the surface) or perform predefined gestures on the location of the shutter button 310 to activate the configuration mode of the camera application. The user may move the shutter button 310 from the default location (x1, y1) to a location (x2, y2) that is within the comfort zone of the thumb of the user's left hand. After releasing the pressure from the region of the shutter button 310, the configuration mode for moving the shutter button is ended and the camera application will save the new mapping location (x2, y2) of the new shutter button 311 into the user's preference settings, and the shutter button 311 will be shown on the location (x2, y2) of the graphical user interface of the camera application when the camera application is executed to take a photo next time based on the updated user's preference settings. In some embodiments, the displaying of the default shutter button 310 is optional, and the user may determine whether to display the default shutter button 310 with the new shutter button 311 simultaneously.

Additionally, the user may also change the size of the shutter button 311 by sliding toward predetermined directions, performing predetermined gestures, or alternating the pressure. For example, when the shutter button 310 has been moved to the location (x2, y2) as the new shutter button 311, the user may perform predetermined gestures (e.g. quickly tapping for several times) to manually activate the configuration mode of the camera application for alternating the size of the shutter button (e.g. original width=w1, and original height=h1) 311. For example, when the configuration mode for alternating the size of the shutter button 311 is activated, the user may press his finger on the shutter button 311 and alternate the pressure to change the size of the shutter button 311. After holding the pressure on the region of the shutter button 311 for a predetermined period (e.g. several seconds), the configuration mode for alternating the size of the shutter button is ended and the camera application will save the new size of the shutter button 311 (e.g. new width=w2, new height=h2) into the user's preference settings, and the shutter button 311 will be shown with the new size on the graphical user interface of the camera application when the camera application is executed to take a photo next time based on the updated user's preference settings.

It should be noted that the details for moving the shutter button and alternating the size of the shutter button are described the embodiments of FIGS. 3A-3C. The above-described operations for the shutter button can also be applied to other buttons or icons on the graphical user interface of the camera application, such as the flash light button, camera switch button, photo gallery button, photo configuration button, photo preview button, HDR mode button, etc.

It should also be noted that the shutter button on the graphical user interface of the camera application is to control the shutter of the camera to take a photo. The user may also tap on the remaining portion of the preview screen of the camera application other than the shutter button to select the object to be focused on, and calibrate the exposure settings of the photo to be captured.

Figure 4A:
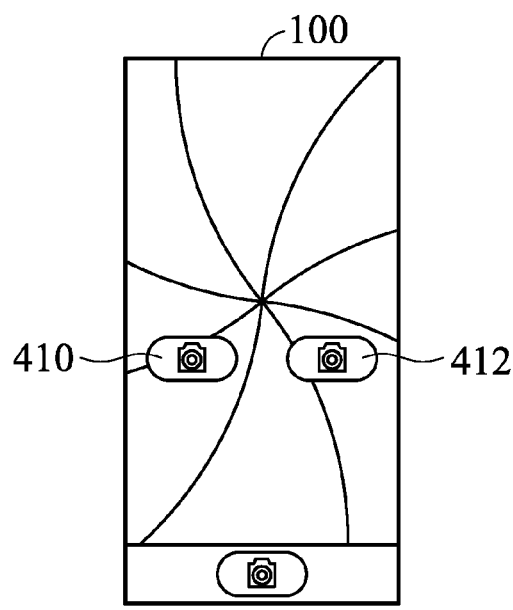
FIG. 4A is a diagram of the shutter buttons on the GUI of the camera application in the portrait mode in accordance with an embodiment of the invention.
Figure 4B:
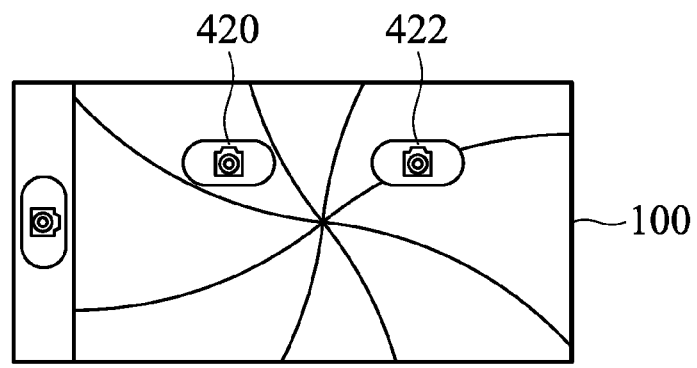
FIG. 4B is a diagram of the shutter buttons on the GUI of the camera application in the landscape mode in accordance with an embodiment of the invention.

FIG. 4A is a diagram of the shutter buttons on the GUI of the camera application in the portrait mode in accordance with an embodiment of the invention. FIG. 4B is a diagram of the shutter buttons on the GUI of the camera application in the landscape mode in accordance with an embodiment of the invention. In some embodiments, the processing unit 130 may receive sensor data from the sensors 170 such as the accelerometer and gyroscope, and determine whether the portable electronic device 100 is in the portrait mode or the landscape mode. When it is determined that the portable electronic device 100 is in the portrait mode, the processing unit 130 automatically displays two shutter buttons on the GUI of the camera application on locations 410 and 412 that are within the comfort zone of both the left hand and right hand, as shown in FIG. 4A, and thus the user may easily press one of the shutter buttons no matter whether the left hand or right hand is holding the portable electronic device 100.

Similarly, when it is determined that the portable electronic device 100 is in the landscape mode, the processing unit 130 automatically displays two shutter buttons on the GUI of the camera application on locations 420 and 422 that are within the comfort zone of both the left hand and right hand, and thus the user may easily press one of the shutter buttons no matter whether the left hand or right hand is holding the portable electronic device 100. In the embodiments of FIGS. 4A and 4B, the processing unit 130 may automatically alternate the positions of the shutter buttons in response of the determination result whether the portable electronic device 100 is in the portrait mode or the landscape mode.

Figure 4C:
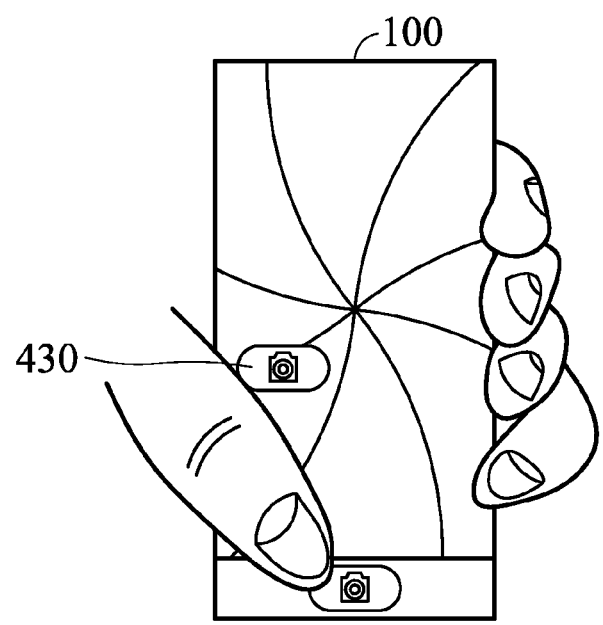
FIG. 4C is a diagram of the shutter button on the GUI of the camera application in accordance with another embodiment of the invention.

FIG. 4C is a diagram of the shutter button on the GUI of the camera application in accordance with another embodiment of the invention. In some embodiments, the sensors 170 may comprise different types of sensors that are deployed on different surfaces of the housing of the portable electronic device 100. In addition to detecting whether the portable electronic device 100 is in the portrait mode or the landscape mode, the processing unit 130 may also detect the positions of fingers that hold the portable electronic device 100 according to the sensor data from the sensors 170 (e.g. detecting changes in voltages, capacitance values, or magnetic fields, or using infrared-ray detection), and determine an appropriate location of the shutter button to be shown on the GUI of the camera application in response to the detected positions of the fingers, where the details for determining the appropriate location of the shutter button will be described later in the embodiments of FIGS. 5A-5D and 6A-6D.

It should be noted that the detection of the portrait mode/landscape mode and the positions of fingers as described in the aforementioned embodiments can be used together so as to provide a better position for the shutter button for the user's convenience.

Figure 5A:
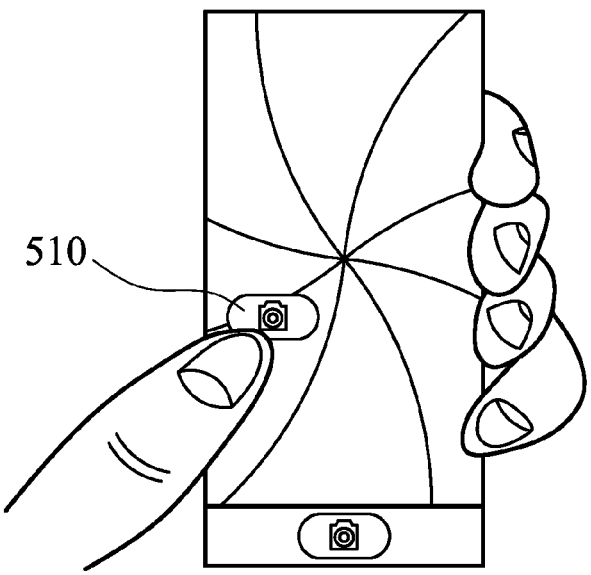
FIGS. 5A-5D are diagrams of grip patterns of the portable electronic device in the portrait mode in accordance with an embodiment of the invention.
Figure 5B:
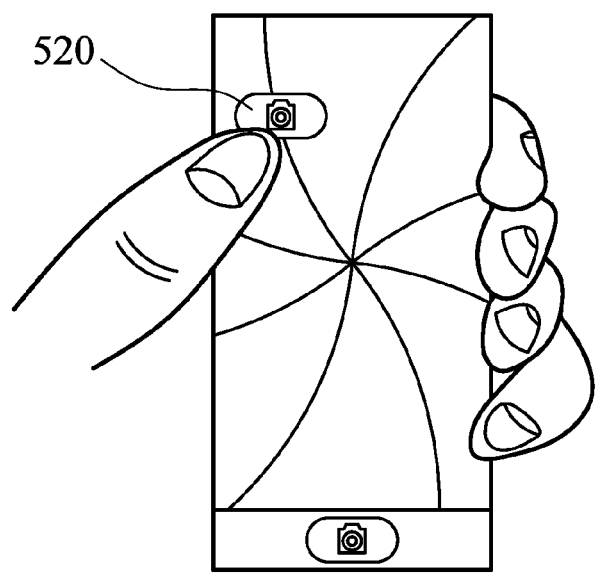
Figure 5C:
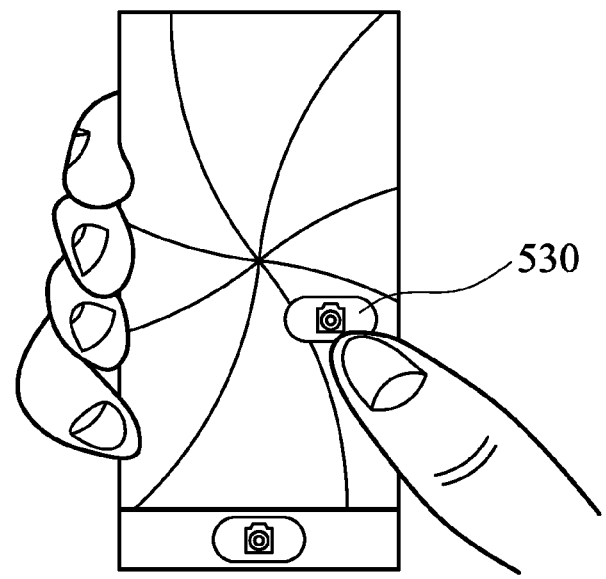
Figure 5D:
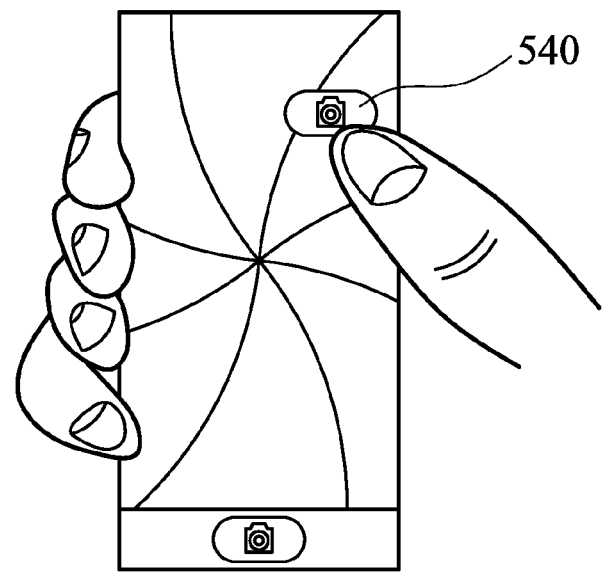

FIGS. 5A-5D are diagrams of grip patterns of the portable electronic device in the portrait mode in accordance with an embodiment of the invention. Specifically, when it is detected that the portable electronic device 100 is in the portrait mode, the processing unit 130 may further determine the grip positions of the fingers (i.e. grip patterns) on the portable electronic device 100. There are several grip patterns that the user can use to hold the portable electronic device 100 with either the left hand or right hand in the portrait mode, as shown in FIGS. 5A-5D. For example, when the user holds the portable electronic device 100 with his left hand as shown in FIG. 5A, the camera application will automatically show the shutter button on the location 510 on the GUI of the camera application. When the user holds the portable electronic device 100 with his left hand as shown in FIG. 5B, the camera application will automatically show the shutter button on the location 520 on the GUI of the camera application. When the user holds the portable electronic device 100 with his right hand as shown in FIG. 5C, the camera application will automatically show the shutter button on the location 530 on the GUI of the camera application. When the user holds the portable electronic device 100 with his right hand as shown in FIG. 5D, the camera application will automatically show the shutter button on the location 540 on the GUI of the camera application.

FIGS. 6A-6D are diagrams of grip patterns of the portable electronic device in the landscape mode in accordance with an embodiment of the invention. Alternatively, when it is detected that the portable electronic device 100 is in the landscape mode, the processing unit 130 may further determine the grip positions of fingers (i.e. grip patterns) on the portable electronic device 100. There are several grip patterns that the user can use to hold the portable electronic device 100 with either the left hand or right hand in the landscape mode, as shown in FIGS. 6A-6D.

Figure 6A:
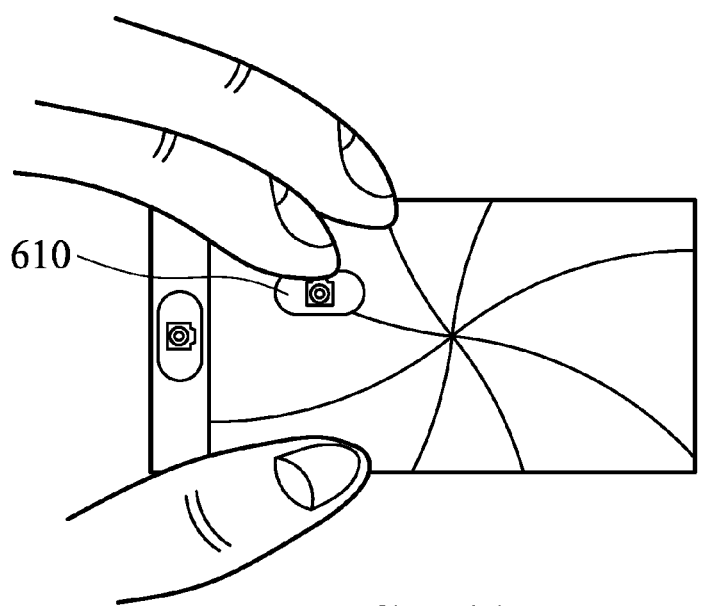
FIGS. 6A-6D are diagrams of grip patterns of the portable electronic device in the landscape mode in accordance with an embodiment of the invention.
Figure 6B:
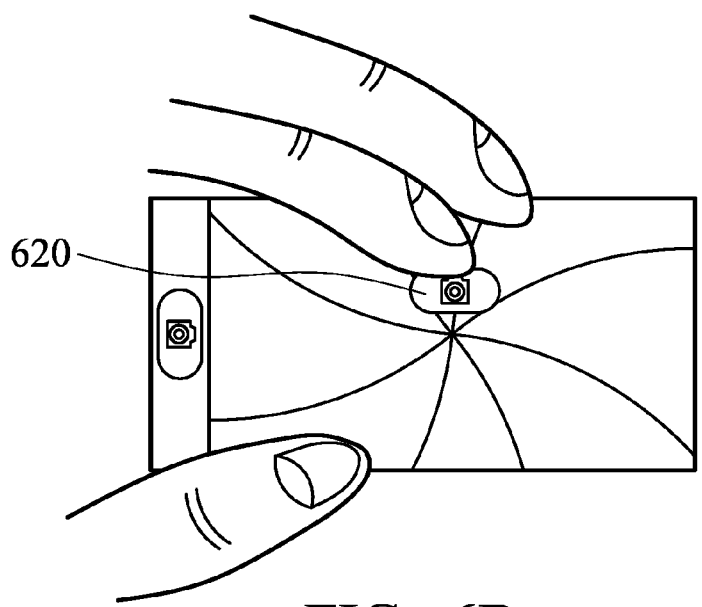
Figure 6C:
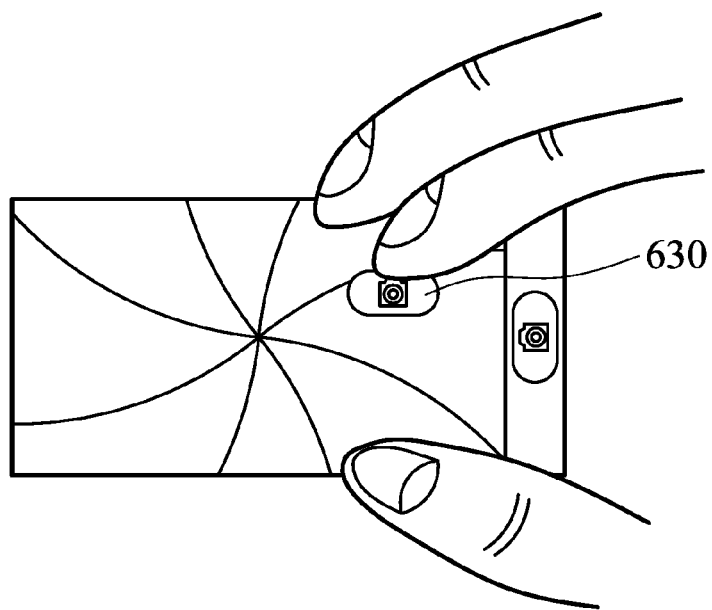
Figure 6D:
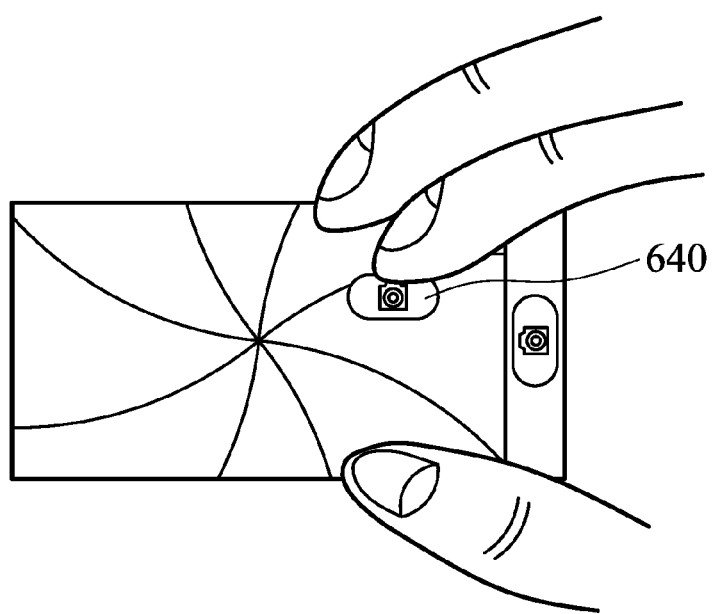

For example, when the user holds the portable electronic device 100 with his left hand as shown in FIG. 6A, the camera application will automatically show the shutter button on the location 610 on the GUI of the camera application. When the user holds the portable electronic device 100 with his left hand as shown in FIG. 6B, the camera application will automatically show the shutter button on the location 620 on the GUI of the camera application. When the user holds the portable electronic device 100 with his right hand as shown in FIG. 6C, the camera application will automatically show the shutter button on the location 630 on the GUI of the camera application. When the user holds the portable electronic device 100 with his right hand as shown in FIG. 6D, the camera application will automatically show the shutter button on the location 640 on the GUI of the camera application.

Figure 7A:
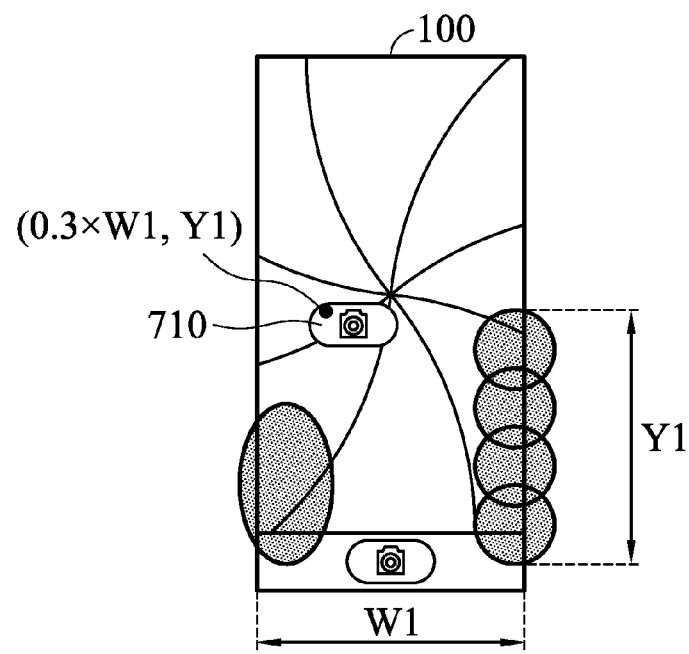
FIGS. 7A-7B are diagrams of the respective positions of the shutter buttons while holding the portable electronic device in the portrait mode in accordance with an embodiment of the invention.
Figure 7B:
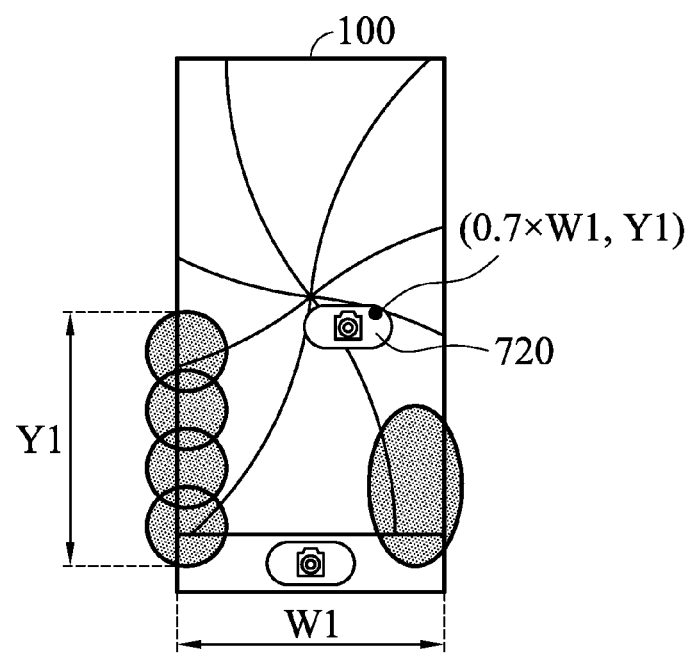

FIGS. 7A-7B are diagrams of the respective positions of the shutter buttons while holding the portable electronic device in the portrait mode in accordance with an embodiment of the invention. In the embodiments of FIGS. 5A-5D, when it is detected that the user holds the portable electronic device 100 in the portrait mode with his left hand as shown in FIG. 7A, the height Y1 of the four fingers except for the thumb is calculated. Assuming that the reference point is at the left-bottom corner of the portable electronic device 100, the processing unit 130 may display the new shutter button 710 at the position (0.3*W1, Y1), where W1 denotes the width of the portable electronic device 100, and the weighting factor can be dynamically adjusted based on practical situations. Similarly, when it is detected that the user holds the portable electronic device 100 in the portrait mode with his right hand as shown in FIG. 7B, the height Y1 of the four fingers except for the thumb is calculated. The processing unit 130 may display the new shutter button 720 at the position (0.7*W1, Y1), where the weighting factor can be dynamically adjusted based on practical situations. It should be noted that if the user holds the portable electronic device 100 in the portrait mode with his left hand or right hand at an upper position, the appropriate position of the new shutter button can also be adjusted accordingly.

Figure 8A:
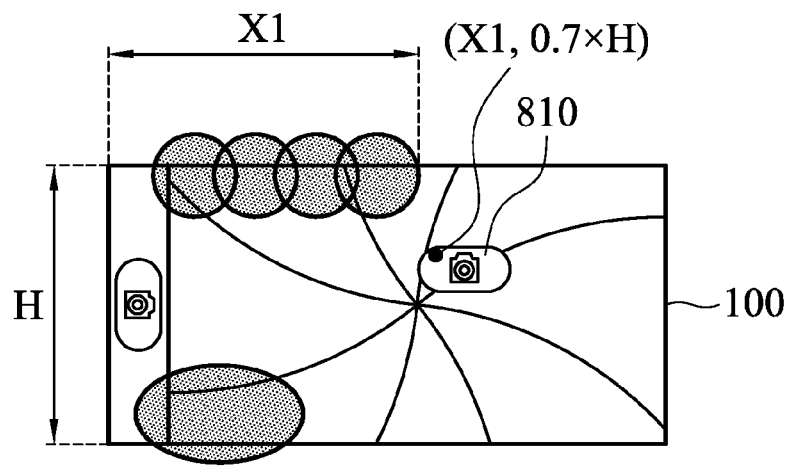
FIGS. 8A-8B are diagrams of the respective positions of the shutter buttons while holding the portable electronic device in the landscape mode in accordance with an embodiment of the invention.
Figure 8B:
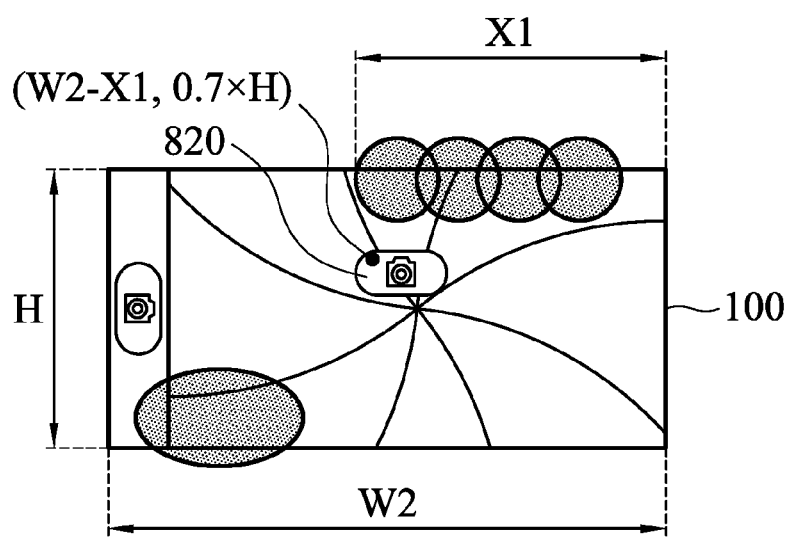
Figure 9A:
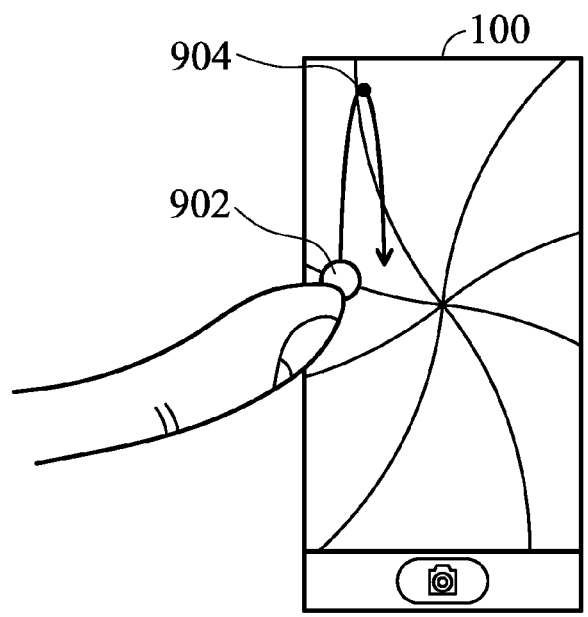
FIGS. 9A-9H are diagrams of displaying the positions of the new shutter button based on different trigger gestures in accordance with an embodiment of the invention.
Figure 9B:
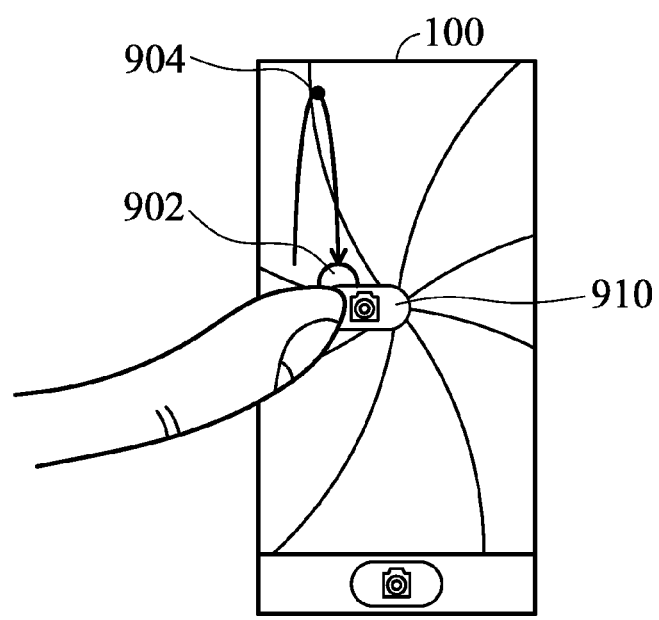
Figure 9C:
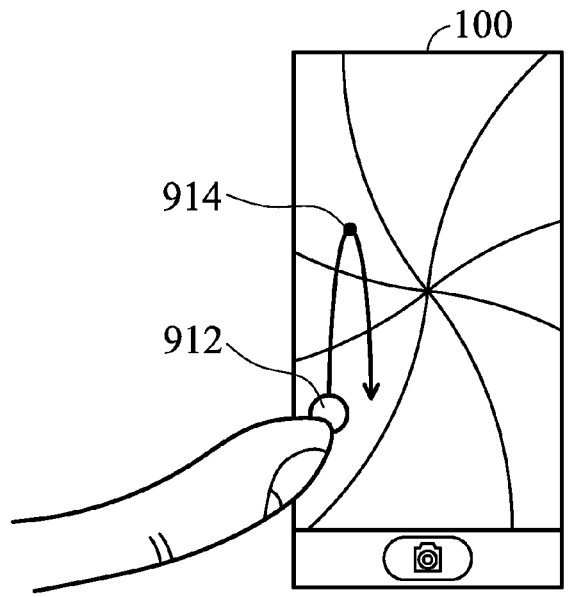
Figure 9D:
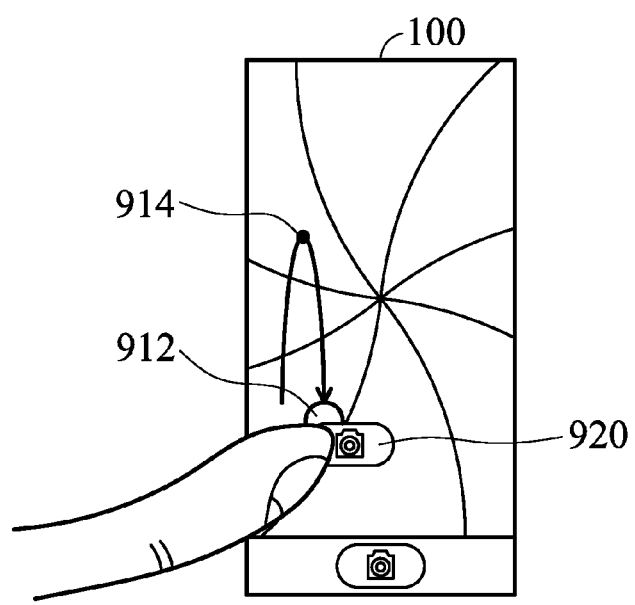
Figure 9E:
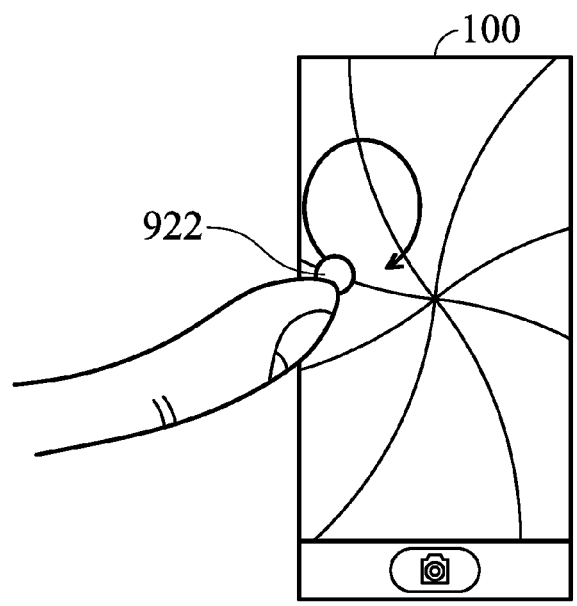
Figure 9F:
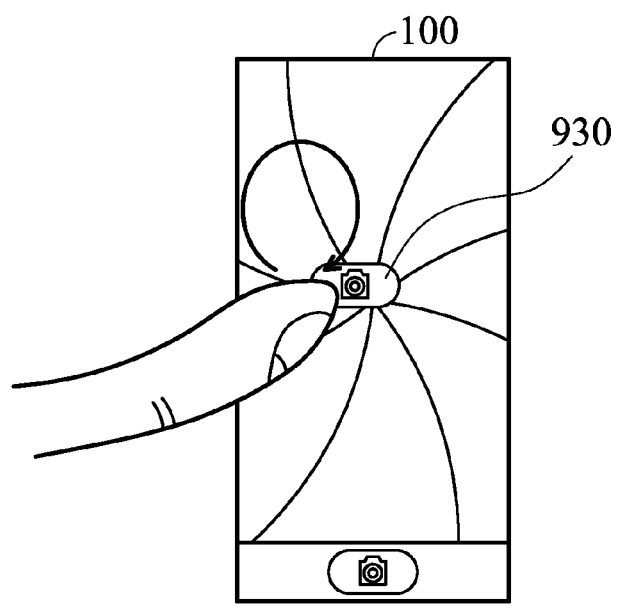
Figure 9G:
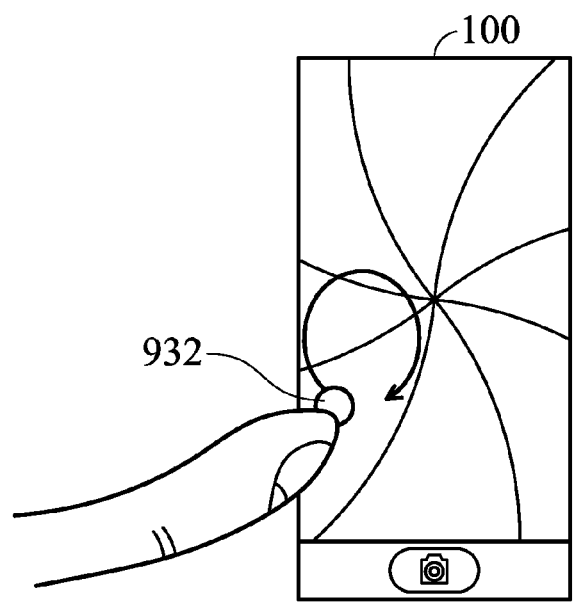
Figure 9H:
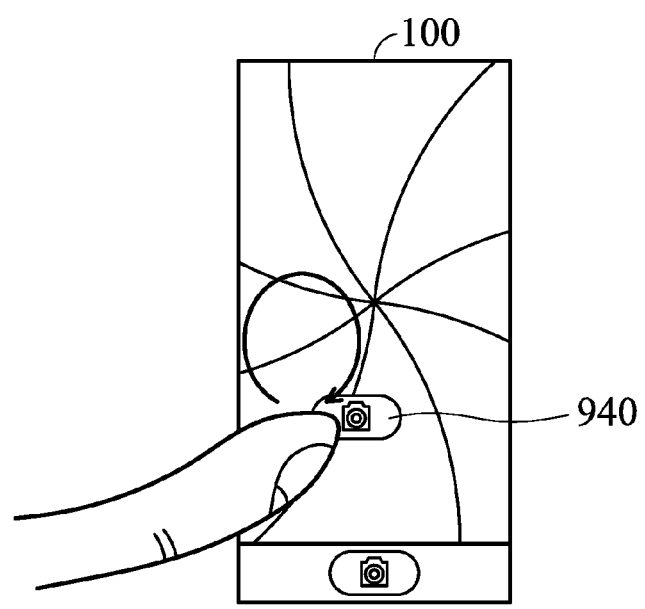

FIGS. 8A-8B are diagrams of the respective positions of the shutter buttons while holding the portable electronic device in the landscape mode in accordance with an embodiment of the invention. In the embodiments of FIGS. 6A-6D, when it is detected that the user holds the portable electronic device 100 in the landscape mode with his left hand as shown in FIG. 8A, the width X1 of the four fingers except for the thumb is calculated. Assuming that the reference point is at the left-bottom corner of the portable electronic device 100, the processing unit 130 may display the new shutter button at the position (X1, 0.7*H), where H denotes the height of the portable electronic device 100, and the weighting factor can be dynamically adjusted based on practical situations. Similarly, when it is detected that the user holds the portable electronic device 100 in the landscape mode with his right hand as shown in FIG. 7B, the width X1 of the four fingers except for the thumb is calculated. The processing unit 130 may display the new shutter button at the position (W2−X1, 0.7 H), where W2 denotes the width of the portable electronic device 100. It should be noted that if the user holds the portable electronic device 100 in the landscape mode with his left hand or right hand at different position in the X-axis, the appropriate position of the new shutter button can also be adjusted accordingly.

FIGS. 9A-9H are diagrams of displaying the positions of the new shutter button based on different trigger gestures in accordance with an embodiment of the invention. In some embodiments, the user may manually set the position of the new shutter button on the GUI of the camera application using specific trigger gestures. For example, referring to FIGS. 9A-9B, the user may perform a sliding-up-and-down gesture on the touch screen of the portable electronic device 100. For example, the user may perform the gesture that starts from position 902 to position 904, and slides back to position 902. The processing unit 130 may detect the specific "sliding-up-and-down" gesture and render the new shutter button 910 at the center or the end point of the specific gesture on the touch screen. Similarly, referring to FIGS. 9C-9D, the user may perform the gesture that starts from position 912 to position 914, and slides back to position 912. The processing unit 130 may detect the specific "sliding-up-and-down" gesture and draw the new shutter button 920 at the center or the end point of the specific gesture on the touch screen.

Alternatively, the user may also use another specific trigger gesture such as drawing a circle to set the position of the new shutter button of the GUI of the camera. For example, referring to FIGS. 9E-9F, the user may perform the specific gesture by drawing a circle on the touch screen of the portable electronic device 100, where the circle starts and ends at the position 922. The processing unit 130 may detect the specific "drawing-a-circle" gesture and render the new shutter button 930 at the center or the end point of the specific gesture on the touch screen. Similarly, referring to FIGS. 9G-9H, the user may perform the specific gesture by drawing a circle on the touch screen of the portable electronic device 100, where the circle starts and ends at the position 932. The processing unit 130 may detect the specific "drawing-a-circle" gesture and render the new shutter button 940 at the center or the end point of the specific gesture on the touch screen.

Figure 10A:
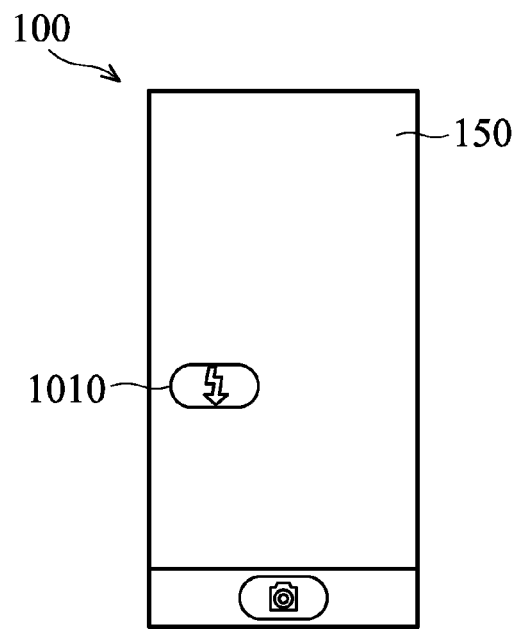
FIGS. 10A and 10B are diagrams illustrating operations for moving an integrated icon and expanding the functions in the integrated icon in accordance with an embodiment of the invention.
Figure 10B:
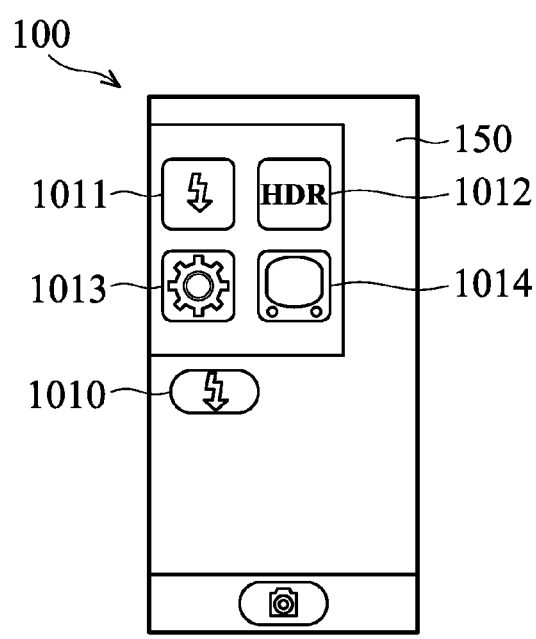

FIGS. 10A and 10B are diagrams illustrating operations for moving an integrated icon and expanding the functions in the integrated icon in accordance with an embodiment of the invention. Referring to FIG. 10A, the integrated icon 1010 may represent a set of function buttons, such as the flash light button, camera switch button, photo gallery button, photo configuration button, photo preview button, HDR mode button, etc. Referring to FIG. 10B, when the user press the integrated icon 1010 on the touch screen, an expanded menu showing the icons 1011~1014 in the integrated icon 1010 will be displayed on the touch screen around the position of the integrated icon 1010 that can be moved to the comfort zone of the user. For example, the icons 1011~1014 may be a flash light button, a HDR selection button, settings button, and photo preview button, respectively. The operations for moving an integrated icon 1010 are similar to those for moving the shutter button, as described in the embodiment of FIGS. 3A-3C, and thus the details will be omitted here. It should be noted that the shutter button is not integrated into the integrated icon because it is more intuitive to take a photo by directly pressing on the shutter button rather than pressing the integrated icon first.

It should be noted that the original function and appearance of the shutter button can be kept unchanged or disabled in the aforementioned embodiments of FIGS. 2-4. Specifically, the user may select whether to disable the original shutter button at the default position after manually moving the shutter button or automatically determining the appropriate position of the shutter button. If the user selects to keep the original shutter button, the user can press either on the original shutter button or the duplicated shutter button within the comfort zone to take a photo.

Figure 11:
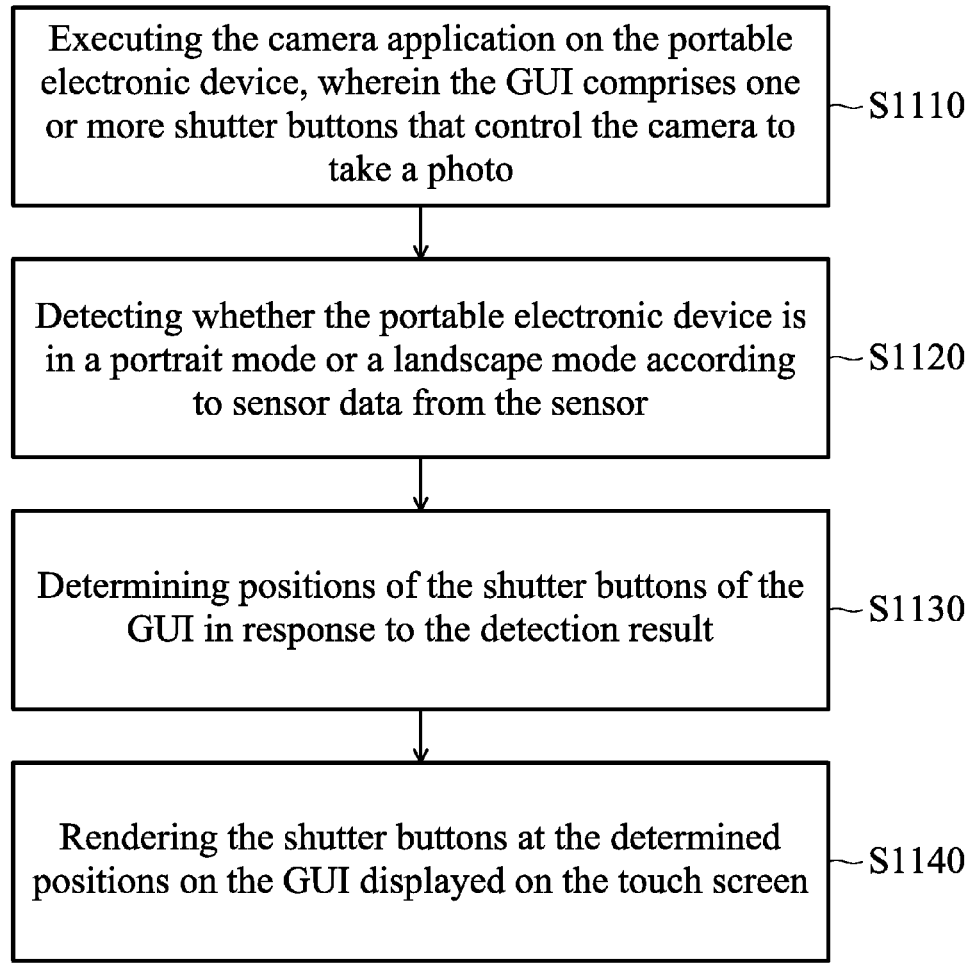
FIG. 11 is a flow chart of a method for controlling a GUI of a camera application on a portable electronic device in accordance with an embodiment of the invention.

FIG. 11 is a flow chart of a method for controlling a GUI of a camera application on a portable electronic device in accordance with an embodiment of the invention. In this embodiment, the portable electronic device 100 comprises a camera, a touch screen, and a sensor (e.g. an accelerometer). In step S1110, the camera application is executed on the portable electronic device, wherein the GUI comprises one or more shutter buttons that control the camera to take a photo. In step S1120, it is detected whether the portable electronic device is in a portrait mode or a landscape mode according to sensor data from the sensor. In step S1130, positions of the shutter buttons of the GUI are determined in response to the detection result. In step S1140, the shutter buttons are rendered at the determined positions on the GUI displayed on the touch screen.

Figure 12:
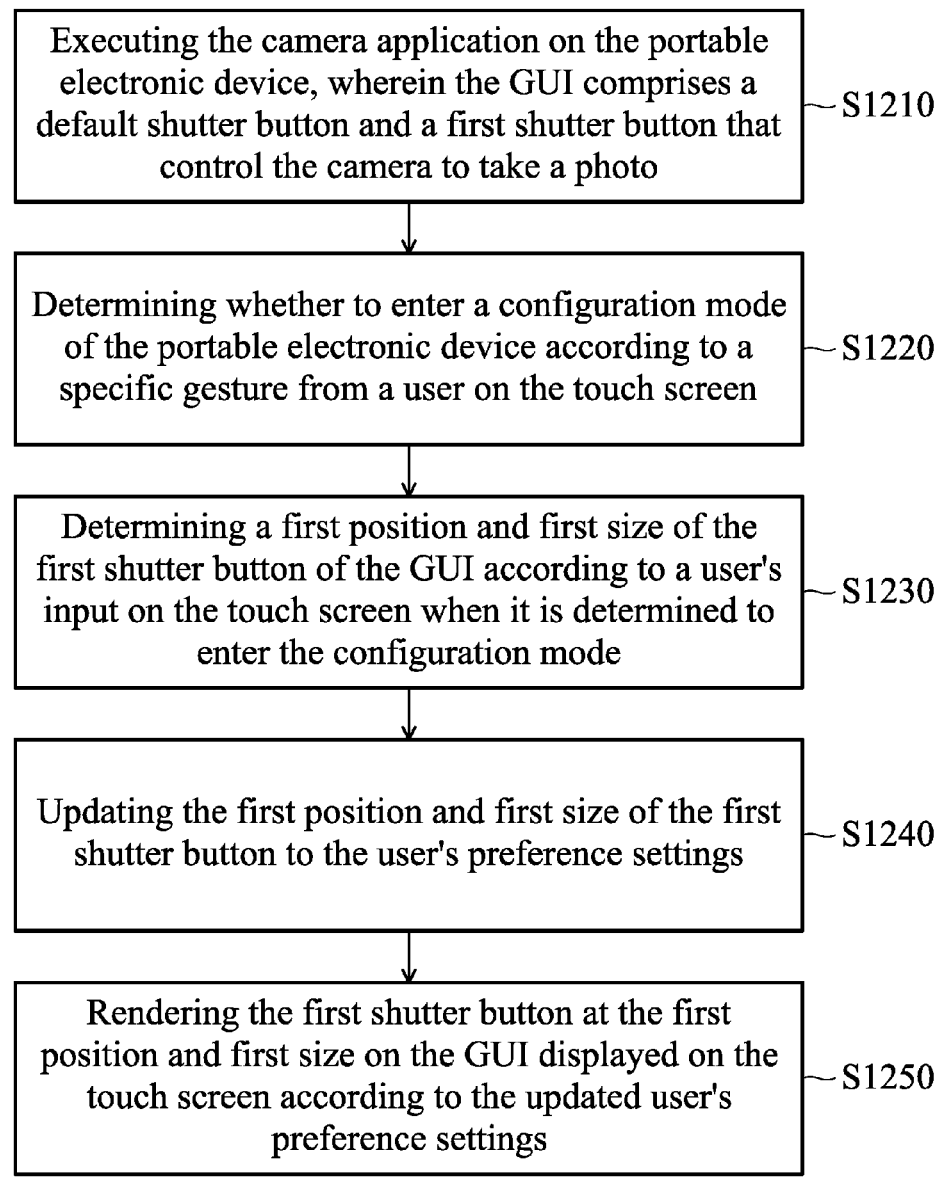
FIG. 12 is a flow chart of a method for controlling a GUI of a camera application on a portable electronic device in accordance with another embodiment of the invention.

FIG. 12 is a flow chart of a method for controlling a GUI of a camera application on a portable electronic device in accordance with another embodiment of the invention. In this embodiment, the portable electronic device 100 comprises a camera, a touch screen, and a plurality of sensors. In step S1210, the camera application is executed on the portable electronic device, wherein the GUI comprises a default shutter button and a first shutter button that control the camera (i.e. the camera can be the main camera 110 or the front camera 120) to take a photo. In step S1220, it is determined whether to enter a configuration mode of the portable electronic device according to a specific gesture from a user on the touch screen. For example, the user may tap on the default shutter button for a predetermined period to activate the configuration mode, thereby alternating positions and sizes of the shutter buttons.

In step S1230, a first position and first size of the first shutter button of the GUI are determined according to a user's input on the touch screen when it is determined to enter the configuration mode. For example, the user's input may be a specific gesture on the touch screen, as described in the embodiments of FIGS. 9A-9H. Alternatively, the user's input may also be the detected grip positions of the fingers that hold the portable electronic device 100. In step S1240, the first position and first size of the first shutter button is updated to the user's preference settings (e.g. stored in the non-volatile memory 142). In step S1250, the first shutter button is rendered at the first position and first size on the GUI displayed on the touch screen according to the updated user's preference setting.

In view of the above, a method and a portable electronic device for controlling a GUI of a camera application are provided in the invention. The method and the portable electronic device are capable of alternating the position and size of the shutter button of the camera application (i.e. applications that use the camera of the portable electronic device to take photos), so that it is more convenient for the user to press the shutter button in a comfort zone while holding the portable electronic device with one hand. Furthermore, the determined best position for the shutter button can be either manually defined by the user or automatically detected by the portable electronic device (e.g. portrait/landscape modes, and grip positions). Accordingly, with the assistance of the method and portable electronic device provided in the invention, the user's experience of taking photos with the portable electronic device with one hand can be enhanced.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling a graphical user interface (GUI) of a camera application on a portable electronic device, wherein the portable electronic device comprises a camera, a touch screen, and a plurality of sensors, the method comprising:
    executing the camera application on the portable electronic device, wherein the GUI comprises a default shutter button and a first shutter button that control the camera to take a photo;
    determining whether to enter a configuration mode of the portable electronic device according to a specific gesture from a user on the touch screen;
    determining a first position and first size of the first shutter button of the GUI according to a user's input on the touch screen when it is determined to enter the configuration mode;
    updating the first position and first size of the first shutter button to the user's preference settings; and
    rendering the first shutter button at the first position and first size on the GUI displayed on the touch screen according to the updated user's preference settings.

2. The method as claimed in claim 1, wherein the user's input is a specific grip position indicating grip positions of fingers of a hand that the user holds the portable electronic device with.

3. The method as claimed in claim 2, further comprising:
    detecting the grip positions according to sensor data from the sensors;
    determining a second position of the shutter button of the GUI according to the detected grip positions of the fingers; and
    displaying the shutter button at the determined positions on the touch screen.

4. The method as claimed in claim 3, further comprising:
    determining whether the portable electronic device is in a portrait mode or a landscape mode; and determining the first position of the first shutter button of the GUI according to the determination result.

5. The method as claimed in claim 1, wherein the GUI further comprises one or more function buttons, and the method further comprises:
   alternating positions and sizes of the function buttons according to the user's input on the touch screen.

6. The method as claimed in claim 5, wherein the function buttons are integrated into an integrated icon.

7. The method as claimed in claim 1, further comprising:
   simultaneously rendering the default shutter button and the first shutter button on the GUI displayed on the touch screen.

8. The method as claimed in claim 1, wherein the user's input is a specific gesture on the touch screen.

9. A portable electronic device, comprising:
   a camera;
   a touch screen;
   a plurality of sensors; and
   a processor, for executing the camera application on the portable electronic device, wherein the GUI comprises a default shutter button and a first shutter button that control the camera to take a photo;
   wherein the processor further determines whether to enter a configuration mode of the portable electronic device according to a specific gesture from a user on the touch screen, and determines a first position and first size of the first shutter button of the GUI according to a user's input on the touch screen when it is determined to enter the configuration mode,
   wherein the processor further updates the first position and first size of the first shutter button to the user's preference settings, and renders the first shutter button at the first position and first size on the GUI displayed on the touch screen according to the updated user's preference settings.

10. The portable electronic device as claimed in claim 9, wherein the user's input is a specific grip position indicating grip positions of fingers of a hand that the user holds the portable electronic device with.

11. The portable electronic device as claimed in claim 10, wherein the processor further detects the grip positions according to sensor data from the sensors, determines a second position of the shutter button of the GUI according to the detected grip positions of the fingers, and rendering the shutter button at the determined positions on the GUI displayed on the touch screen.

12. The portable electronic device as claimed in claim 11, wherein the processor further determines whether the portable electronic device is in a portrait mode or a landscape mode, and determines the first position of the first shutter button of the GUI according to the determination result.

13. The portable electronic device as claimed in claim 9, wherein the GUI further comprises one or more function buttons, and the processor further alternates positions and sizes of the function buttons according to the user's input on the touch screen.

14. The portable electronic device as claimed in claim 13, wherein the function buttons are integrated into an integrated icon.

15. The portable electronic device as claimed in claim 9, wherein the processor simultaneously renders the default shutter button and the first shutter button on the GUI displayed on the touch screen.

16. The portable electronic device as claimed in claim 9, wherein the user's input is a specific gesture on the touch screen.

* * * * *